United States Patent [19]
Blaszykowski et al.

[11] Patent Number: 5,125,027
[45] Date of Patent: Jun. 23, 1992

[54] CENTRAL OFFICE LINE INTERFACE CIRCUIT FOR AN ANALOG NETWORK PRIVATE TELEPHONE INSTALLATION

[75] Inventors: Raymond Blaszykowski, Argenteuil; Robert Girard, Colombes; André Bonvallet, Asnieres, all of France

[73] Assignee: Alcatel Business Systems, Paris, France

[21] Appl. No.: 540,246

[22] Filed: Jun. 19, 1990

[30] Foreign Application Priority Data

Jun. 19, 1989 [FR] France ............... 89 08116

[51] Int. Cl.⁵ .................................. H04M 19/00
[52] U.S. Cl. .................... 379/399; 379/345; 379/402; 379/331
[58] Field of Search ............ 379/345, 338, 399, 402, 379/403, 404, 412, 331

[56] References Cited

U.S. PATENT DOCUMENTS

| | | |
|---|---|---|
| 3,930,127 | 12/1975 | Warren et al. |
| 4,369,337 | 1/1983 | Parlor ............... 379/399 |
| 4,440,979 | 4/1984 | McGibbon et al. |
| 4,563,547 | 1/1986 | Booth ............... 379/399 X |
| 4,856,058 | 8/1989 | Sato et al. ............... 379/402 X |
| 4,864,609 | 9/1989 | Moisin ............... 379/399 X |
| 4,866,768 | 9/1989 | Sinberg ............... 379/399 X |
| 5,014,305 | 5/1991 | Moisin ............... 379/402 |

FOREIGN PATENT DOCUMENTS

| | | |
|---|---|---|
| 0238972 | 9/1987 | European Pat. Off. |
| 2361025 | 3/1978 | France |
| 1591869 | 6/1981 | United Kingdom |

Primary Examiner—James L. Dwyer
Assistant Examiner—Magdy W. Shehata
Attorney, Agent, or Firm—Sughrue, Mion, Zinn, Macpeak & Seas

[57] ABSTRACT

Central office line interface circuit connecting a private telephone installation to a local central office. The central office line interface circuit includes a twin-loop line current polarity detector including a first optocoupler (57) for signalling polarity reversal, a transmission bridge (22) including a line loopback circuit operating via a second optocoupler (74) and provided with regulator and blocking means; it further comprises simplified tone and charging pulse detectors (24, 18).

11 Claims, 4 Drawing Sheets

5,125,027

CENTRAL OFFICE LINE INTERFACE CIRCUIT FOR AN ANALOG NETWORK PRIVATE TELEPHONE INSTALLATION

BACKGROUND OF THE INVENTION

The invention concerns a central office line interface circuit (hereinafter: COLIC) for a private telephone installation on an analog network. A COLIC connects the switch or key service unit of a private telephone installation to a local central office, which is usually part of a telephone network, to enable telephones or terminals connected to the private installation to communicate with telephones and terminals connected to the network but not connected to the installation.

At present many network subscriber lines are still of the analog type and transmit speech signals in analog form on two wires in an audible frequency band between 300 and 3 400 Hz. These lines can also be used to transmit digital data which is encoded so that it can be transmitted in the frequency band defined above, for example by two-frequency or multifrequency encoding. The two line wires are also used to transmit signalling, for example by modification of the impedance or in the form of a voltage or current or pulses at specified frequencies.

Existing private telephone switches usually employ time switching with the result that the speech signals are coded in digital form. This type of switching is well suited to the transmission of speech and data signals on the same media according to the changing requirements of users.

SUMMARY OF THE INVENTION

The invention therefore proposes a central office line interface circuit for connecting a private telephone installation to an analog telephone network line, comprising a line interface including a transmission bridge, a ringing detector and an optional charging pulse detector connected in parallel to the two wires of an analog telephone network line via a protection circuit, together with a cofidec circuit and a tone detector connected in parallel via an impedance matching and two-wire/four-wire converter circuit connected by a transformer to the protection circuit via the transmission bridge.

According to one characteristic of the invention, the interface includes a transmission bridge comprising:

a diode rectifier bridge connected to the wires of the line on the output side of the protection device, a line current polarity detector comprising a first loop connecting the wire to the negative input terminal of the rectifier bridge via a diode of a first optocoupler the cathode of which is connected to said negative input terminal and via a second diode with its cathode connected to the wire and its anode connected to the anode of the diode of the optocoupler and a second loop comprising a resistor connected to the positive input terminal of the bridge and which feeds a Darlington circuit in which the collectors of the two transistors are connected together by the diode of the optocoupler, the transistor of the optocoupler supplying a characteristic inversion binary signal, and a line loopback control circuit comprising a second optocoupler receiving binary control signals via its diode and controlling line loopback via its transistor.

BRIEF DESCRIPTION OF DRAWINGS

The invention, its characters and its advantages are described below with reference to the figures listed below.

DETAILED DESCRIPTION OF THE PREFERRED EMBODIMENTS

Figure 1:
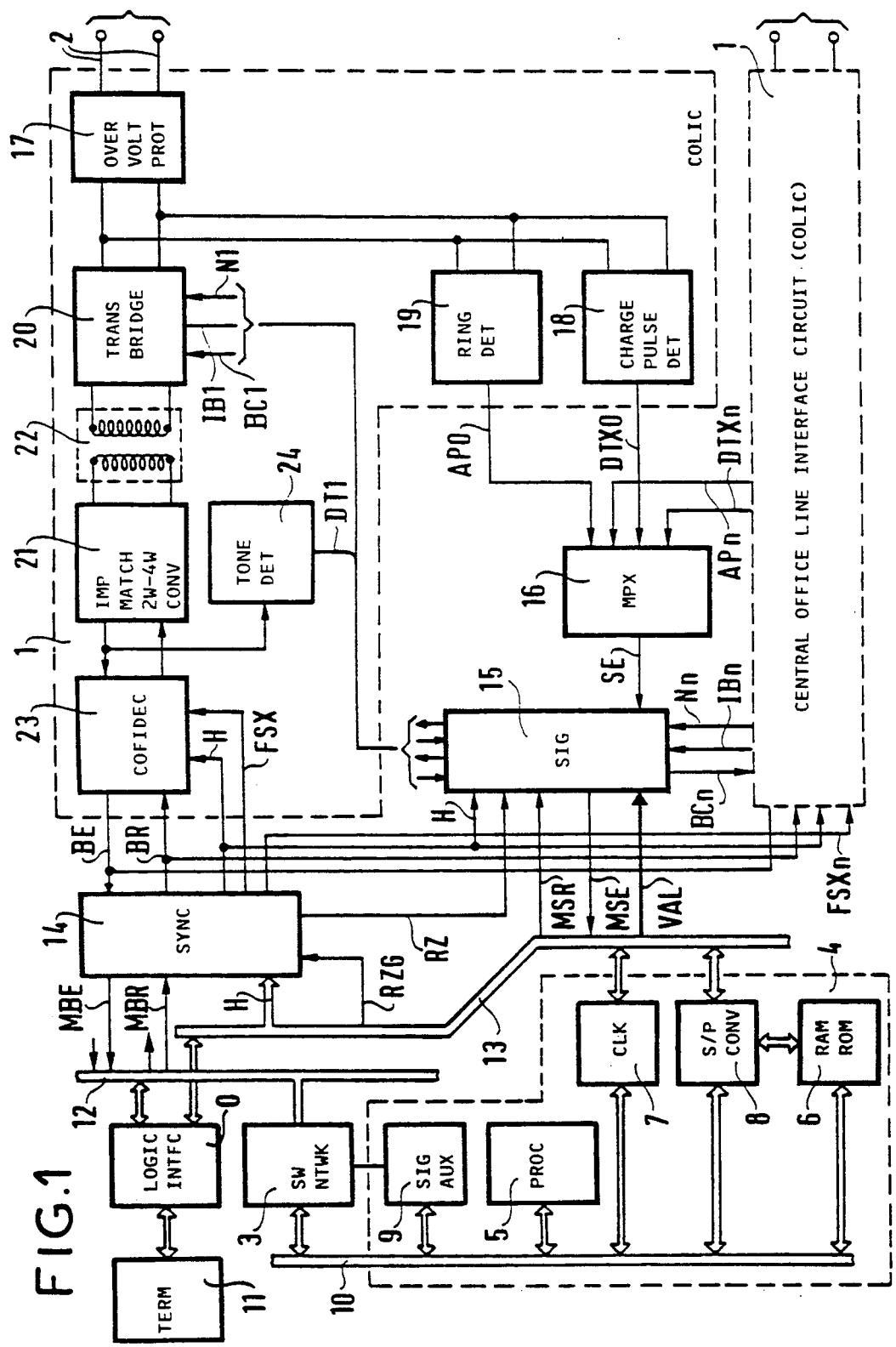
FIG. 1 shows one example of a COLIC for a time-division switching telephone installation.

The COLICs 1 shown in FIG. 1 are each adapted to connect a private telephone installation of which they form part to an analog network subscriber line 2 connected to a local telephone central office (not shown) which is usually integrated into a network in a known way. To this end the COLIC 1 is conventionally connected to the two wires "A, B" of the line 2 and is conventionally associated with other COLICs 1 which service the same installation and which are individually connected to respective network subscriber lines 2. The time-division switching telephone installation incorporating the COLIC 1 conventionally comprises a digital switching network 3 in the form of a time-division switching matrix which is adapted, for example, to interconnect eight bidirectional multiplexes each providing 32 time slots at 64 kbit/s. The switching network is controlled by a control unit 4 conventionally based on at least one processor 5, a set of random access memory (RAM) and/or read only memory (ROM) 6 and a clock 7. In the example shown, the control unit 4 further includes centralized auxiliary units such as a series-parallel converter 8 and a signalling auxiliary (generator or receiver) unit 9. A multiline bus 10 interconnects the various components of the control unit 4 and enables control of the switching network 3.

In the installation shown, the COLICs 1 terminate the telephone lines 2 and the various termination circuits 11 for connecting extension telephones or terminals or dedicated lines (tie lines, for example) are connected to the switching network 3 by at least one multiplex link 12 enabling bidirectional transmission of voice and/or data digital signal bytes. In one embodiment seven two-wire voice-data multiplex links MBE, MBR each providing 32 time slots service the telephone terminations in the form of the termination circuits 11 and the COLICs 1, an additional multiplex link servicing in one direction the generators and in the other direction the receivers constituting the signalling auxiliaries unit 9.

A further multiplex link 13 handles interchanges of signalling within the installation, here interconnecting the COLICs 1, the termination circuits 11 and the converter circuit 8. It comprises a two-wire link time-shared between the entities which use it under the control of the clock 7. The converter circuit 8 serializes information supplied in parallel form by the control unit 4 via the bus 10 and converts to parallel form information supplied serially to the control unit by the signalling multiplex link 13. The termination circuits 11 are not described in detail here in that they are entirely conventional and can be of highly diverse forms, but have no direct relationship to the invention.

In one embodiment the signalling multiplex link 13 operates at 2 Mbit/s and provides 256 time slots per frame on each of the two wires MSR, MSE of which one transmits individual commands from the control unit 4 via the converter circuit 8 and the other transmits the observation results transmitted via the same converter circuit to the control unit by the termination circuit 11 and the COLICs 1 which have access to their own time slots.

Each of the terminations represented by the termination circuits 11 and the COLICs 1 supplies cyclically during a frame via the time slot assigned to it information indicating its type. Each termination is connected by a logic interface 0 to the multiplexer 12 and the multiplexer 13 which service it, the interface 0 essentially comprising a synchronization circuit 14 for interchanges via the voice-data multiplex link MBE-MBR to which this COLIC is connected and a signalling circuit 15; in this instance the two circuits 14 and 15 are common to a plurality of COLICs 1 connected to the same voice-data multiplex link.

In one embodiment each synchronization circuit 14 provides an interface between a number "n" (in this instance n=8) COLICs 1 and a voice-data multiplex link MBE, MBR and processes on their behalf the transmission and the reception of voice-data bytes in the time slots reserved to them on this link. Two links H, RZG from the control unit 4 respectively supply the various clock signals conventionally required and generated by the clock 7 and a conventional reset signal.

Similarly, each signalling circuit 15 services a group of "n" COLICs 1 connected to the same synchronization circuit. It transmits and receives the signalling data conveyed for them by the two wires MSE, MSR in the time slots individually assigned to them on the signalling multiplex link 13. The signalling data received from the control unit 4 is transmitted bit by bit by the signalling circuit 15 to the "n" COLICs 1 concerned via individual links BC1 and N1 through BCn and Nn; further signalling data is provided either by the COLICs directly, for example via the links IB1 through IBn, or through a common multiplexer 16 via links AP1 and DTX1 through APn and DTXn.

Each signalling circuit 15 is selectively addressable by the control unit 4 via an enabling link Val, comprising three wires in this instance and enabling selection of the circuit, selection of the signalling interchange times for the "n" COLICs and selection of the frames in which are alternately transmitted the signalling data and the information relating to the COLIC type. The operation controlling signals transmitted by the clock link H and by a reset link RZ are in this instance obtained through the intermediary of the associated synchronization circuit 14.

The COLIC 1 is conventionally connected to the two wires of the telephone line 2 by an overvoltage protection device 17 which protects against any voltage surges on the line. A charging pulse detector 18, a ringing detector 19 and a transmission bridge 20 are connected in parallel with the two wires of the telephone line 2 via the protection device 17 in each COLIC 1. The characteristic ringing or charging pulse detection signals provided by the detectors 18 and 19 are transmitted in digital form to the associated signalling circuit 15 via the corresponding multiplexer 16 which receives them on two separate inputs.

The transmission bridge 20 essentially comprises a polarity detector indicating to the signalling circuit 15 by means of a binary signal IB, for example signal IB1, reversing of the polarity of the battery voltage applied to the telephone line 2 by the local central office at which the line terminates. It further includes a line loopback and loop disconnect dialling control circuits supplying a signal BC, for example the signal BC1, and a line current regulator circuit, these latter circuits not being shown in FIG. 1.

An impedance matching and two-wire/four-wire converter circuit 21 is connected to the wires of the telephone line 2 through the protection device 17, the transmission bridge 20 and a transformer 22 connected in series. The circuit 21 makes the connection between the transformer 22 and a cofidec (coder-filter-decoder) circuit 23 connected to the synchronization circuit 14 servicing the COLIC 1 of which it is part. It also connects the transformer 22 to a tone detector 24 of the COLIC 1. The transformer 22 conventionally isolates the circuits connected to one of its two windings from those connected to the other winding and provides bidirectional transmission of alternating current signals, including those in the telephone band.

The circuit 23 is a conventional coding-filtering-decoding unit which converts into analog signals that can be transmitted over the telephone line 2 digital signals communicated in byte form by the associated synchronization circuit 14, via the time-division multiplex link formed by the wire BE in turn connected to the wire MBE of the multiplex link 12, together with the conversion into digital signals of analog signals supplied over the telephone line 2 for successive transmission over the wires BR and NBR. To this end the circuit 23 receives conventionally clock signals via the link H and a channel time slot select signal FSX via an individual link, for example the link FSX1 for the circuit 1, to enable it to effect the transmission in which it is involved.

Figure 2A:
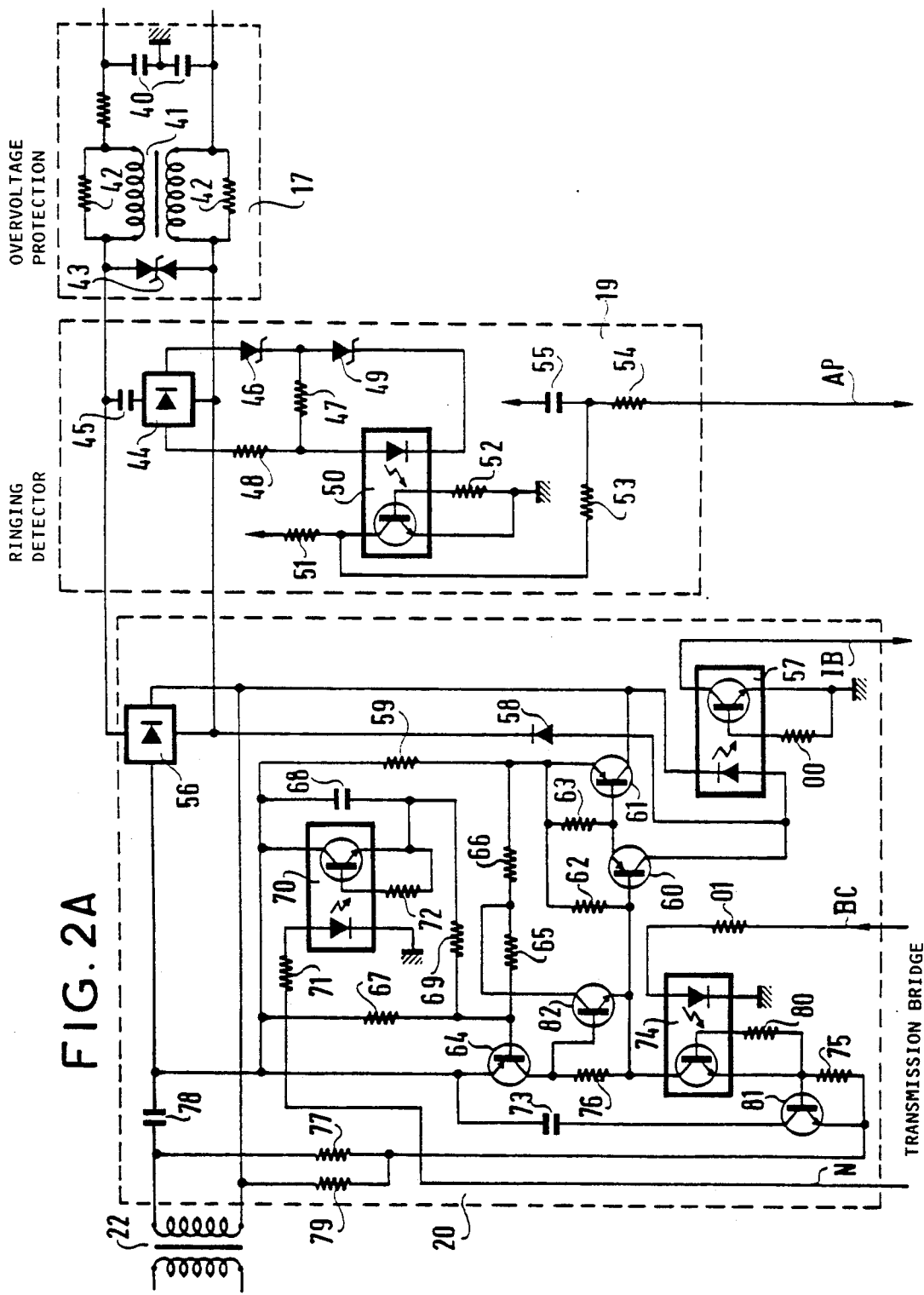
FIGS. 2A, 2B, 2C show one example of implementation of the COLIC schematically shown in FIG. 1.
Figure 2B:
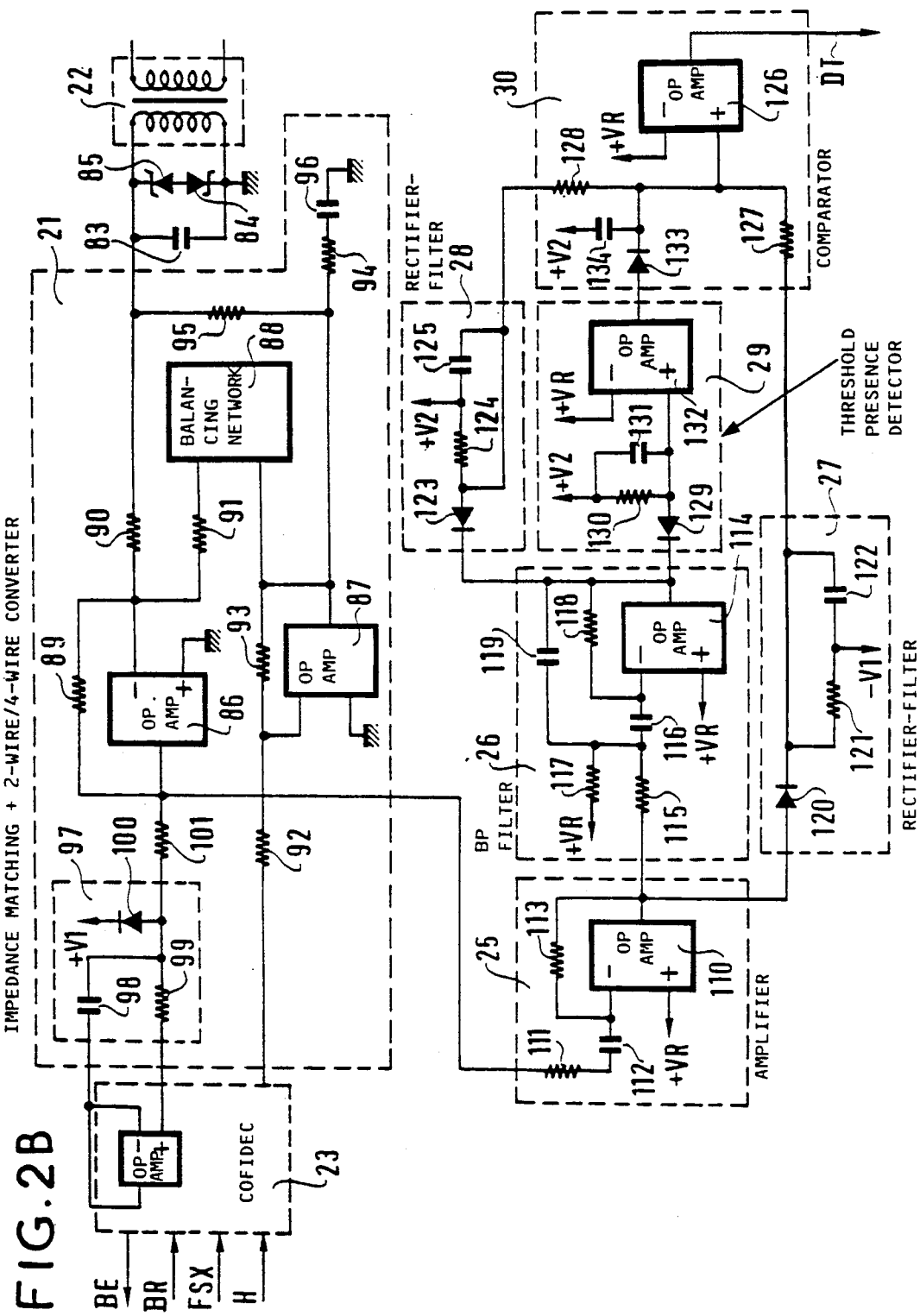
Figure 2C:
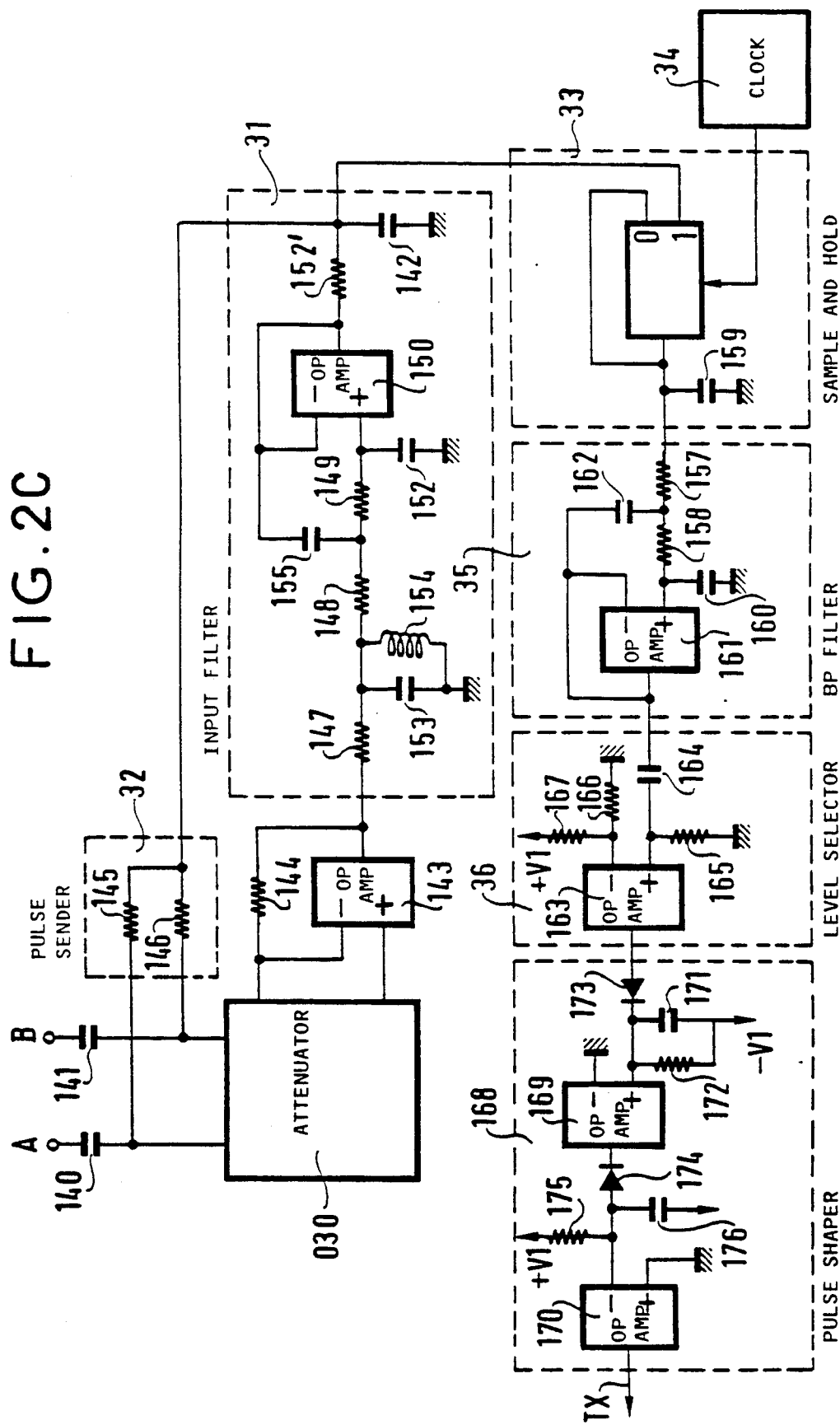

FIGS. 2A through 2C show in more detail the composition of an analog network COLIC in accordance with the invention.

As explained above, the COLIC 1 is connected by a protection device 17 to the wires A, B of a telephone line 2 terminating at a local central office (not shown). The device 17 comprises, for example, two equal-value capacitors 40 connected in series between the wires A, B on the input side of two inductive circuits, one on each of the two wires, each inductive circuit including one of the two windings of a transformer 41 and a resistor 42 shunting this winding, a surge arrester diode 43 connected between the wires on the output side of the inductive circuits completing this device in the conventional way.

The capacitors 40 and the inductive circuits protect the COLIC against radio-frequency interference and the diode 43 and the capacitors 40 protect the COLIC and the subsequent circuits against voltage surges on the line.

The ringing detector 19 shunting the wires of the telephone line 2 on the output side of the protection device 17 is conventionally designed to detect line disconnect ringing currents (frequency 25 or 50 Hz, for example) received over the line 2 and to convert them into binary logic signals 18, for example the signal AP0, with the same timing characteristics and compatible with the control unit 4 which controls the COLIC 1. The ringing detector 19 also includes a diode rectifier bridge 44 supplied with power via the wires of the line 2 via a capacitor 45 connected to the wire A to block the DC component of signals transmitted by the line.

The alternating component of the signals from the line 2 is rectified by the bridge 44 and applied to the input of a circuit comprising two loops: the first loop comprises a reverse biased first zener diode 46 and two resistors 47, 48 connected in series with the diode across the rectified current output of the bridge 44; the second loop comprises, connected across the resistor 47, a second zener diode in series with the first and the diode of an optocoupler 50 which is connected in the opposite direction to the zener diodes.

The NPN phototransistor of the optocoupler 50 supplies an output signal well suited to controlling HC-MOS technology components. Its collector is connected to the positive supply +5 V by a high-value resistor 51 and its base is biased by a high-value resistor 52. Consequently, the current in the diode of the optocoupler 50 is very low and this improves the accuracy of detection which is triggered by the voltage crossing a zener threshold instead of depending on the gain of the optocoupler stage.

The ringing detection signal supplied by the COLIC is taken by a connection AP from the collector of the transistor of the optocoupler 50 via two resistors 53, 54 in series and the common point of which is connected to the +5 V supply by a capacitor 53 in a conventional circuit.

The transmission bridge 20 includes a diode rectifier bridge 56 connected between the line wires A, B on the output side of the protection device 17 and in parallel with the bridge 44. A first circuit in the transmission bridge detects reversal of the polarity of the battery voltage applied by the local central office to the wires A, B of the telephone line 2. This circuit includes a first loop connecting the B wire to the negative input of the rectifier bridge 56 through a diode of an optocoupler 57 the cathode of which is connected to said negative input and by a second diode 58 with its cathode connected to the B wire and its anode connected to that of the diode of the optocoupler 57. The latter isolates the circuits on its input and output sides, in other words the telephone line from the COLIC and the installation including it.

A second loop includes a resistor 59 which is connected to the positive input of the bridge 56 and which feeds a Darlington circuit comprising two transistors 60, 61 associated with two resistors 62, 63 each biasing the base of one transistor; the collectors of these transistors are connected together by the diode of the optocoupler 57.

When the supply voltage on the line is normal the diode 58 is turned off and the diode of the optocoupler 57 carries a current obtained from the line. When the battery voltage polarity is reversed the current from the line flows through the diode 58 and the optocoupler, which is not energized correctly, is inactive.

The polarity reversal signal provided by the COLIC is taken by a link IB from the collector of the transistor in the optocoupler 57, the base of which is conventionally biased relative to ground potential by a resistor 00. The line current drawn by the COLIC 1 is essentially that flowing through the resistor 59 and the Darlington circuit mentioned above, and this current is regulated by a circuit combining a PNP transistor 64 with its emitter connected to the positive input of the bridge 56, its collector connected to the base of the transistor 60 and its base connected to the collector of the transistor 61 via two resistors 65, 66 in series. If the line current increases the voltage across the resistor 59 increases and, on crossing a predetermined threshold, turns on the transistor 64, which tends to turn off the Darlington circuit.

It is possible to increase the regulated line current by adding a resistor 67 between the positive pole of the bridge 56 and the base of the transistors 64. It is possible to increase the line current during seizure of the line and dialling by adding a capacitor 68 in series with a resistor 69 in parallel with the resistor 67. The common point of this capacitor 68 and this resistor 69 is connected to the emitter of the NPN transistor of an optocoupler 70 adapted to be controlled by the control unit 4 (by appropriate software, for example) via the signalling circuit 15 servicing the COLIC and a link N adapted to energize the diode of the optocoupler 70 through a resistor 71. A resistor 72 biases the base of the transistor of the optocoupler 70.

Low-impedance flow of low-frequency current in the transmission bridge mentioned above can be blocked when the current is not regulated by adding a capacitor 73 between the positive pole of the bridge 56 and the collector of an NPN transistor 81 the base of which is connected to the emitter of the transistor of an optocoupler 74 adapted to cut off selectively the base current of the transistor 60 of the Darlington circuit. To this end the collector of the transistor of the optocoupler 74 is connected to the base of the transistor 60 and the emitter of the NPN transistor of the optocoupler is connected between the input terminals of the bridge 56, through a resistor 77 and a capacitor 78 in the case of the positive terminal and a resistor 79 in the case of the negative terminal; a bias resistor 80 conventionally connects the base and the emitter of the transistor of the optocoupler 74. A loopback signal BC also used for line seizure, dialling and ring trip controls the diode of the optocoupler 74 and emanates from the signalling circuit 15 servicing the COLIC 1 in question.

In the described embodiment the NPN transistor 81 disconnects the capacitor 78 during dialling phases to disable it and to keep it charged when the line is disconnected during these phases. The collector of the transistor 81 is connected to the capacitor 73 and its emitter is connected to the common point of the resistors 77 and 79, its base being connected to the common point of a bias resistor 75 of the transistor of the optocoupler 74 and the emitter of this transistor, so that it is turned on only when the optocoupler 74 is active. When the loop is closed protection against overvoltages is provided by an NPN transistor 82 the emitter of which is connected to the common point of a resistor 76 biasing its base and the collector of the transistor of the optocoupler 74. Its collector is connected to the common point of the resistors 65 and 66. These two common points are therefore connected together when the voltage across the resistor 76 is too high, the base of the transistor 82 being connected to the common point of the collector of the transistor 64 and the resistor 76.

A winding of the isolating transformer 22 connects together the wires connected to the input terminals of the bridge 56 beyond the DC blocking capacitor 78 and the connection points of the resistors 77 and 79.

A second winding of the transformer 22 connects the cofidec circuit 23 and the tone detector 24 to the telephone line 2 via the impedance matching and two-wire/four-wire converter circuit 21, as shown in FIG. 1.

The conventional circuit 21 is connected to the second winding of the transformer 22 via an overvoltage protection circuit conventionally comprising a capacitor 83 in parallel with two zener diodes 84, 85 with their cathodes connected together and each having its anode connected to one end of said second winding, the anode of one diode and one of the terminals of the winding being grounded.

The circuit 21 uses operational amplifiers, two amplifiers 86, 87 being respectively disposed in the transmit channel to the cofidec circuit 23 and in the channel receiving analog signals produced by the cofidec circuit 23. A balancing network 88 conventionally implemented with resistors and capacitors matches the COLIC 1 to the various lines to which it may be connected. The amplifiers 86 and 87 have their non-inverting inputs grounded. They are conventionally connected to the point common to the transformer 22, to the cathode of the zener diode 85 and to the capacitor 83, the first via its inverting input and an resistor 90 and the second via its output and a resistor 95.

The balancing network 88 is conventionally connected to the amplifiers 86 and 87, to the inverting input of the first by a resistor 91 and to the output of the second, the output of each of these two amplifiers being looped back to the corresponding inverting input via a resistor 89 or 93, the output of the second being further grounded by a circuit comprising a resistor 94 and a capacitor 96 in series.

An additional filter for eliminating signals at the charging pulse frequency is inserted between the output of the amplifier 86 and the corresponding serial input of the cofidec circuit 23 to prevent the cofidec circuit reacting to signals at the charging pulse frequency. Here the filter comprises two high-value resistors 99, 101 in series with their common point connected to a diode 100 whose cathode is grounded and to an inverting input of an operational amplifier in the cofidec circuit 23, this amplifier having its output looped back to its inverting input which is connected to the common point of the resistors 99, 101 by a capacitor 98.

The cofidec circuit is a conventional circuit, for example a National Semiconductors TP 3057 with serial input and output.

The tone detector 24 from FIG. 1 is adapted to capture the dialling tone which is transmitted, for example, in the form of a sinusoidal signal in the frequency band 300 to 500 Hz. The tone detector includes an amplifier 25 (FIG. 2B) with a minimum input threshold which comprises an operational amplifier 110 with its inverting input connected to the output of the amplifier 86 through a resistor 111 and a capacitor 112; the non-inverting input of this operational amplifier is connected to a median reference voltage +VR enabling all of the available dynamic range to be used and preventing clipping of the received signal.

A resistor 113 conventionally loops the output of this operational amplifier 110 to its inverting input. A bandpass filter 26 amplifies the signals in the 300 to 500 Hz band and attenuates signals at a frequency above 600 Hz or below 160 Hz. This filter is a first order filter, for example, centered on the frequency of the expected tone. It is based on an operational amplifier 114 whose inverting input is connected to the output of the amplifier 110 through a resistor 115 in series with a capacitor 116, the non-inverting input being connected to +VR.

The common point of the resistor 115 and the capacitor 116 is connected to +VR by a resistor 117. The output of the amplifier 114 is fed back to its inverting input via a resistor 118 and a capacitor 119 connected to the common point of the resistors 115, 117 and the capacitor 116. A first rectifier-filter 27 is connected to the output of the amplifier 110 by a diode 120 with its anode connected to this output; it includes a high-value resistor 121 and a capacitor 122 in parallel between the cathode of the diode 120 and a negative supply voltage −V1, enabling storage of the maximum value of positive half-cycles of the signal applied to the input of the bandpass filter. A second rectifier-filter 28 is connected to the output of the amplifier 114 by the diode 123 whose cathode is connected to this output; it includes a resistor 124 and a capacitor 125 in parallel between the anode of the diode 123 and a positive supply voltage +V2. The second rectifier-filter stores maximum negative values of the signal at the output of the bandpass filter.

The output signals from the two rectifier-filters 27, 28 are applied to a comparator 30, to be more precise to the non-inverting input of an operational amplifier 126 in this comparator, via two high-value resistors 127, 128, one for each rectifier-filter. The inverting input of the amplifier 126 is connected to +VR.

The presence at the filter output of a signal at a level clearly higher than the level of the input signal is interpreted as characterizing the presence of the tone to be detected, provided the level of this signal at the output is above a predetermined minimum level set by a threshold presence detector 29 connected to the output of the bandpass filter 26 in parallel with the second rectifier-filter 28.

The threshold presence detector 29 includes a rectifier-filter comprising a diode 129 with its cathode connected to the output of the amplifier 114 and a resistor 130 and a capacitor 131 in parallel between the anode of the diode 129 and the +V2 voltage. The output of this rectifier-filter is the common point of the anode of the diode 129, the resistor 130 and the capacitor 131. It is connected to the non-inverting input of an operational amplifier 132 whose inverting input is connected to +VR.

The amplifier 132 is connected by a diode 133 to the non-inverting input of the amplifier 126 as are the outputs of the rectifier-filters 27 and 28, via resistors 127 and 128.

If the bandpass filter output signal level is below a threshold set by the diode 129 the output signal from the amplifier 126 is set by that of the amplifier 132 and produces a binary signal of the opposite kind to that characterizing the presence of a tone on the DT link.

If the output signal of the bandpass filter, in other words the output signal of the amplifier 114, exceeds the threshold set by the diode 129 the amplifier 126 reverse biases the diode 133 to turn it off and the signal applied to the non-inverting input of the amplifier 126 is the sum of the opposite polarity signals supplied by the rectifier-filters 27 and 28 via the resistors 127 and 128. A binary signal characterizing detection of tone is then produced on the DT link if the value of the output signals from the resistors 127, 128 indicates the existence of a filtered signal with a greater amplitude that the signal applied to the filter input.

The charging pulse detector circuit 18 from FIG. 1 is shown in detail in FIG. 2C and is designed to be connected to the two wires A, B of the telephone line 2 on the output side of the protection device 17 and via two capacitors 140 and 141 to eliminate the DC components.

An attenuator circuit 030, not described here because it is conventional and does not characterize the invention, is connected to the A, B wires via the capacitors 140 and 141. It drives an input filter 31 via a amplifier 143 the output of which is conventionally looped to the inverting input via a resistor 144.

The input filter 31 has moderate selectivity and is centered on the frequency of the (very low frequency) charging signal which is conventionally transmitted in differential mode by the local central office via the two wires A, B of the line 2. The charging pulse signals, transmitted differentially, are conventionally at a frequency Ft of 12 or 16 kHz. As an alternative to this, the signalling can be transmitted in common mode in the form of extremely low frequency (conventionally 50 Hz) pulses which are processed by a pulse sender 32 connected to the capacitors 140 and 141 in parallel with the input filter.

The pulse sender 32 comprises two resistors 145 and 146 of equal value connected together at one end and each connected to a respective wire A, B at the other end.

The input filter 31 centered on the frequency Ft here comprises three resistors 147, 148 and 149 in series to the non-inverting input of an operational amplifier 150 which is also grounded via a capacitor 152. The common point of the resistors 147 and 148 is grounded by a circuit comprising a capacitor 153 and an inductor 154 in parallel, the output of the amplifier 150 being connected to its inverting input and also to the common point of the resistors 148 and 149 via a capacitor 155. A resistor 152 connected to the output of the amplifier 15 is connected to the common point of the resistors 145, 146 of the pulse sender 32 so that the signal for processing input of a sample and hold circuit 33 which is connected to this common point can be alternately driven by the pulses transmitted differentially by this filter 31 or by the pulses transmitted in common mode by the sender 32.

The sample and hold circuit 33 is activated by a periodic signal supplied to it by a conventional clock circuit 34. The frequency of the clock signal HE used to sample signals supplied by the filter 31 or through the intermediary of the pulse sender 32 is set a value FE chosen as equal to Ft+V+ϵ, V being equal to the permissible frequency variation on the frequency Ft in transmit mode and ϵ representing an error.

Thus in an embodiment in which the signal frequency Ft is 12 kHz the frequency FE chosen is 12 170 Hz, for example, with a permissible error of 70 Hz. This signal is also used if the frequency of the charging pulses that might be received is 50 Hz. The sample and hold circuit therefore supplies an output signal at the image frequency V+ϵ, and therefore in this example at the frequency 170 Hz, the incident frequency Ft being virtually eliminated.

The 50 Hz signal alternately supplied by the pulse sender 32 is virtually unattenuated by sampling it at the frequency FE and therefore appears at the output of the sample and hold circuit 33. The sampled signal obtained, which is conventionally fed back into the sample and hold circuit 33, is also applied to the input of a bandpass filter 35 via an input resistor 157.

The bandpass filter 35 passes a bandwidth of 2V+ϵ so as to pass the signals at the image frequency V+ϵ and those at the frequency 50 Hz; it does not need to be highly selective as the differences between the frequency to be detected and the frequencies to be eliminated are much more significant at the same level for low frequencies at the output of the sample and hold circuit 33 as for the medium frequencies present on the telephone line wires and at the output of the input filter 31. The filter 35 includes a resistor 157 in series with a resistor 158 between two capacitors 159 and 160 each of which is grounded, this circuit driving the non-inverting input of an operational amplifier 161. The output of the operational amplifier 161 is conventionally looped back to its inverting input and to the common point of the resistors 157 and 158 by a capacitor 162. It drives a level detector 36.

A simple level detector 36 connected to the output of the bandpass filter 35 is sufficient for determining whether or not there is a signal present in the passband of the filter and assumed therefore to represent a signal characteristic of charging, which the detector 36 translates into a binary logic signal TX.

The detector 36 is based on an operational amplifier 163 receiving the output signal from the amplifier 161 on its non-inverting input through a capacitor 164, a high-value resistor 165 conventionally grounding this non-inverting input, while the inverting input is connected to the common point of a resistor divider 166, 167 connected between ground and the supply voltage +V1.

The output signal from the amplifier 163 is then applied by a circuit 168 for shaping the charging pulses in binary form for their transmission on the transmission link TX to the signalling circuit servicing the COLIC 1.

This circuit comprises, for example, two operational amplifiers 169, 170 in series, the first having an inverting input grounded and a non-inverting input connected to the negative voltage −V1 by a circuit comprising a capacitor 171 and a resistor 172 in parallel and to the output of the amplifier 163 by a forward biased diode 173. A reverse biased diode 174 connects the output of the amplifier 169 to the inverting input of the amplifier 170 which is connected to the negative voltage −V1 by a capacitor 176 and to the positive voltage +V1 by a resistor 175. The non-inverting input of the amplifier 170 is grounded.

We claim:

1. Central office line interface circuit for connecting a private telephone installation to an analog telephone network line, comprising a line interface including a transmission bridge (20), a ringing detector (19) and an optional charging pulse detector (18) connected in parallel to the two wires (A, B) of an analog telephone network line (2) via a protection circuit (17), together with a cofidec circuit (23) and a tone detector (24) connected in parallel via an impedance matching and two-wire/four-wire converter circuit (21) connected by a transformer (22) to the protection circuit (17) via the transmission bridge, characterized in that the transmission bridge (20) of the interface comprises:

a diode rectifier bridge (56) connected to the wires (A, B) of the line (2) on the output side of the protection device, a line current polarity detector comprising a first loop connecting the wire (B) to the negative input terminal of the rectifier bridge (56) via a diode of a first optocoupler (57) the cathode of which is connected to said negative input terminal and via a second diode (58) with its cathode connected to the wire (B) and its anode connected to the anode of the diode of the optocoupler and a second loop comprising a resistor (59) connected to the positive input terminal of the bridge (56) and which feeds a Darlington circuit in which the collectors of the two transistors (60, 61) are connected together by the diode of the optocoupler, the transistor of the optocoupler supplying a characteristic inversion binary signal (IB), and a line loopback control circuit comprising a second optocoupler (74) receiving binary control signals (BC) via its diode and controlling line loopback via its transistor.

2. Central office line interface circuit for analog telephone network lines according to claim 1 characterized in that the transmission bridge comprises a loop current regulator circuit comprising a PNP transistor (64) with its emitter connected to the positive input terminal of the rectifier bridge (56), its collector connected to the base of the first transistor (60) of the Darlington circuit via a resistor (76) and its base connected to the collector of the second transistor (61) via two resistors (65, 66) in series.

3. Central office line interface circuit for analog telephone network lines according to claim 2 characterized in that the transmission bridge comprises a further resistor (67) between the positive input terminal of the rectifier bridge (56) and the base of the loop regulation transistor (64) to increase the value of the regulated line current.

4. Central office line interface circuit for analog telephone network lines according to claim 2 characterized in that the transmission bridge comprises a capacitor (68) in series with a resistor (69) in parallel with the additional resistor (67) to increase the line current during the line seizure and dialling phases.

5. Central office line interface circuit for analog telephone network lines according to claim 2 characterized in that the transmission bridge comprises a capacitor (73) for blocking low-frequency currents in said transmission bridge under low-impedance conditions, when the current therein is not regulated, said blocking capacitor being connected between the positive input terminal of the rectifier bridge (56) and the collector of an NPN transistor (81) the base of which is connected to the emitter of the transistor of the second optocoupler (74) adapted to control the base current of the first transistor (60) of the Darlington circuit.

6. Central office line interface circuit for analog telephone network lines according to claim 3 characterized in that the transmission bridge comprises an NPN transistor (81) for bypassing the blocking capacitor (73) during the dialling phase, said bypass transistor being connected in series with the blocking capacitor (73) and having its base connected to the emitter of the transistor of the second optocoupler (74) so as to be turned on only if the second optocoupler (74) is active.

7. Central office line interface circuit for analog telephone network lines according to claim 3 characterized in that the transmission bridge comprises a PNP transistor (82) for protecting the transmission bridge against overvoltages when the loop is closed, said protection transistor selectively connecting the common point of a resistor (76) biasing its base and the collector of the transistor of the second optocoupler (74) to the point common to two resistors (65 and 66) connecting the base of the regulating transistor (64) to the emitter of the second transistor (61) of the Darlington circuit, said common points being respectively connected to its emitter and its collector.

8. Central office line interface circuit for analog telephone network lines according to claim 1 characterized in that the line interface includes a ringing detector fed by a diode rectifier bridge (44) connected to the wires (A, B) of the line (2) via a capacitor (45) connected to one wire (A) and which comprises a first loop comprising a first zener diode (46) and two resistors (47, 48) through which flows in series and in the reverse bias direction in the case of the diode the rectified current supplied by the rectifier bridge (44) and a second loop comprising in series, shunting the resistor (47), a second zener diode (49) in series with the first zener diode and with the diode of an optocoupler (50) which is connected in the opposite conduction direction to the zener diode and the transistor of which supplies a characteristic ringing detection binary signal (AP).

9. Central office line interface circuit for analog telephone network lines according to claim 1 characterized in that it comprises a tone signal detector comprising at its input a minimum input threshold amplifier (25) the output of which is connected to the input of a bandpass filter (26) and to the input of a first rectifier-filter (27), a second rectifier-filter (28) connected to the output of the bandpass filter and a threshold presence detector (29) which is also connected to the output of the bandpass filter (26), as is the second rectifier-filter, and which, if it detects a signal with a level above the threshold at the output of said filter, authorizes comparison by a comparator (30) of the filter input and output signals, the presence of a filter output signal having an amplitude higher than that of the input signal characterizing the presence of the expected alternating current signal and producing a binary signal at the comparator output.

10. Central office line interface circuit for analog telephone network lines according to claim 1 characterized in that it comprises a charging pulse detector comprising an input filter (31) of moderate selectivity centered on the very low frequency (Ft) of the expected pulses which are transmitted differentially on the line wires to which the filter is connected, optionally via the protection device, a sample and hold circuit (33) connected to the output of the input filter (31) and to the output of a clock (34) supplying a signal (HE) whose frequency (FE) is near said frequency (Ft) so as to provide at the output a characteristic sampled signal representative of the difference between the frequencies (FE and Ft) when signalling is received, a bandpass filter (35) whose passband includes the characteristic signal, and a level detector (36) adapted to supply a binary digital signal according to whether or not there is present at the output of the bandpass filter (35) a signal characteristic of signalling received at a level higher than a predetermined threshold.

11. Central office line interface circuit for analog telephone network lines according to claim 7 characterized in that the charging pulse detector further comprises a pulse sender (32) for signalling transmitted in common mode on the line wires, said sender having its inputs connected to the wires of the line (2) and to the output of the sample and hold circuit (33) in parallel with the input filter (31).

* * * * *